United States Patent
Sun et al.

(10) Patent No.: US 11,205,866 B2
(45) Date of Patent: Dec. 21, 2021

(54) JOINT STRUCTURE FOR HIGH-VOLTAGE CABLE

(71) Applicant: JING-JIN ELECTRIC TECHNOLOGIES CO., LTD., Beijing (CN)

(72) Inventors: Pengyang Sun, Beijing (CN); Hao Zhang, Beijing (CN); Yanhao Wang, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 16/981,824

(22) PCT Filed: Mar. 8, 2019

(86) PCT No.: PCT/CN2019/077424
§ 371 (c)(1),
(2) Date: Sep. 17, 2020

(87) PCT Pub. No.: WO2019/179318
PCT Pub. Date: Sep. 26, 2019

(65) Prior Publication Data
US 2021/0119356 A1 Apr. 22, 2021

(30) Foreign Application Priority Data
Mar. 21, 2018 (CN) .......................... 201820390061.7

(51) Int. Cl.
*H01R 4/72* (2006.01)
*H01R 4/18* (2006.01)
*H01R 11/12* (2006.01)

(52) U.S. Cl.
CPC ............... *H01R 4/72* (2013.01); *H01R 4/183* (2013.01); *H01R 11/12* (2013.01)

(58) Field of Classification Search
CPC .......... H01R 4/72; H01R 4/183; H01R 11/12; H01R 13/639; H01R 11/09; H01R 4/723;
(Continued)

(56) References Cited

U.S. PATENT DOCUMENTS 4,551,915 A 11/1985 Larsson
7,173,182 B2 * 2/2007 Katsuyama ...... H01R 13/65912
174/36
(Continued)

FOREIGN PATENT DOCUMENTS

CN 201303144 Y 9/2009
CN 203617488 U 5/2014
(Continued)

OTHER PUBLICATIONS

Machine Translation of CN 207082646 U, Mar. 9, 2018, [database online], retrieved on Jun. 17, 2021, Retrieved from IP.com < https://iq.ip.com/discover > (Year: 2021).*
(Continued)

*Primary Examiner* — Travis S Chambers
(74) *Attorney, Agent, or Firm* — Arent Fox LLP

(57) ABSTRACT

A joint structure of a high-voltage cable includes a cable core wrapped from interior to exterior sequentially by an inner insulating layer, a shielding layer and an outer insulating layer, a section of the inner and outer insulating layers is stripped at an end of the cable core, and a length of the stripped section of the outer insulating layer is greater than a length of the stripped section of the inner insulating layer. The end of the cable core is connected to an external terminal, a connection between the end and the external terminal and an adjacent section of the inner insulating layer are wrapped by a heat-shrinkable tube, a spacing is provided between an end of the heat-shrinkable tube and the outer insulating layer, the shielding layer within the spacing is
(Continued)

wrapped by a copper foil and connected externally to a cable connector via the copper foil.

4 Claims, 4 Drawing Sheets

(58) Field of Classification Search
CPC . H01R 4/726; H01R 4/18; H01R 4/20; H01R 13/6596; H01R 13/6592; H02G 15/02; H02G 15/18; H02G 15/04
See application file for complete search history.

(56) References Cited

U.S. PATENT DOCUMENTS

| | | | |
|---|---|---|---|
| 2013/0029523 A1* | 1/2013 | Poma | H01R 9/0518 439/585 |
| 2020/0144771 A1* | 5/2020 | Zhang | H01R 9/0524 |

FOREIGN PATENT DOCUMENTS

| | | |
|---|---|---|
| CN | 107104412 A | 8/2017 |
| CN | 206388875 U | 8/2017 |
| CN | 207082646 U | 3/2018 |
| CN | 208078201 U | 11/2018 |
| DE | 69703613 T2 | 6/2001 |
| JP | 2002042917 A | 2/2002 |
| WO | 97/26693 | 7/1997 |

OTHER PUBLICATIONS

Machine Translation of CN 203617488 U, May 28, 2014, [database online], retrieved on Jun. 17, 2021, Retrieved from IP.com < https://iq.ip.com/discover > (Year: 2021).*
International Search Report issued in PCT/CN2019/077424, dated Jun. 13, 2019, 5 pages.
European Communication from the Examining Division dated Jul. 6, 2021 issued in European patent application No. 19771756.4.

* cited by examiner

JOINT STRUCTURE FOR HIGH-VOLTAGE CABLE

CROSS-REFERENCE TO RELATED APPLICATIONS

This application is a National Stage Entry of PCT/CN2019/077424, filed Mar. 8, 2019, which claims priority to CN application No. 201820390061.7, filed Mar. 21, 2018, the disclosures of each of which are hereby incorporated by reference in their entireties.

TECHNICAL FIELD

The present disclosure relates to a joint structure of a high-voltage cable, used for the connection between a high-voltage cable and a cable connector in a vehicle.

BACKGROUND

Currently, in electric-motor controllers and electric motors of new-energy vehicles, cable connectors that have functions of water resistance and shielding are frequently used. Such a cable connector is connected to a high-voltage cable, the end of the high-voltage cable is provided with an annular terminal, and during the connecting, the shielding layer of the high-voltage cable is required to be exposed to exterior at a certain size to contact the cable connector, to realize the shielding function.

During connecting the cable connector to the high-voltage cable, frequently arise the problem that the safe distance between the annular terminal having a high voltage and the shielding layer is insufficient, thus causing electric leakage; the problem that the cable diameter at the tail of the annular terminal is too large, and therefore the tail cannot be inserted into the cable connector; and the problem that the shielding layer is easily scraped by the cable connector to be damaged.

SUMMARY

To solve the above problems, an object of the present disclosure is to provide a joint structure of a high-voltage cable, which improves the safety during connecting the cable connector to the high-voltage cable, can avoid a too large diameter at the tail end of the high-voltage cable, and can prevent the shielding layer from being scraped by the cable connector to be damaged.

In order to realize the above object, the present disclosure employs the following technical solutions:

A joint structure of a high-voltage cable, comprising a cable core, the cable core being wrapped from interior to exterior sequentially by an inner insulating layer, a shielding layer and an outer insulating layer, a section of the inner insulating layer and of the outer insulating layer being stripped at an end of the cable core, and a length of the stripped section of the outer insulating layer being greater than a length of the stripped section of the inner insulating layer, wherein the end of the cable core is connected to an external terminal, a connection between the end of the cable core and the external terminal and an adjacent section of the inner insulating layer are wrapped by a heat-shrinkable tube, a spacing is provided between an end of the heat-shrinkable tube and the outer insulating layer, the shielding layer within the spacing is wrapped by a copper foil, and the shielding layer is connected externally to a cable connector via the copper foil.

Optionally, the copper foil comprises an outer-layer copper foil and an inner-layer copper foil, a length of the outer-layer copper foil is greater than a length of the inner-layer copper foil, the shielding layer is folded within the spacing, and the folded section is located between the inner-layer copper foil and the outer-layer copper foil.

Optionally, the heat-shrinkable tube comprises an inner-layer heat-shrinkable tube and an outer-layer heat-shrinkable tube, and the outer-layer heat-shrinkable tube wraps the inner-layer heat-shrinkable tube and an adjacent section of the outer-layer copper foil.

Optionally, an inner wall of the outer-layer heat-shrinkable tube is thinned at a section where the outer-layer copper foil is wrapped.

Optionally, the external terminal comprises a sleeve and a connecting ring, the end of the cable core is inserted into the sleeve, and the sleeve is clamped to deform to realize fixed connection to the cable core.

The advantages and beneficial effects of the present disclosure are:

The present disclosure employs the heat-shrinkable tube to isolate the annular terminal from the shielding layer, which enables the safe isolation between high voltage and low voltage.

The shielding layer of the high-voltage cable is outside the heat-shrinkable tube, which can avoid a too large diameter at the tail end of the high-voltage cable.

The present disclosure employs the copper foil to wrap the shielding layer, which increases the strength of the shielding layer, which can prevent the shielding layer at the shielding-contact-point contacting area from being, during the installation of the high-voltage harness, scraped to be damaged.

Figure 1:
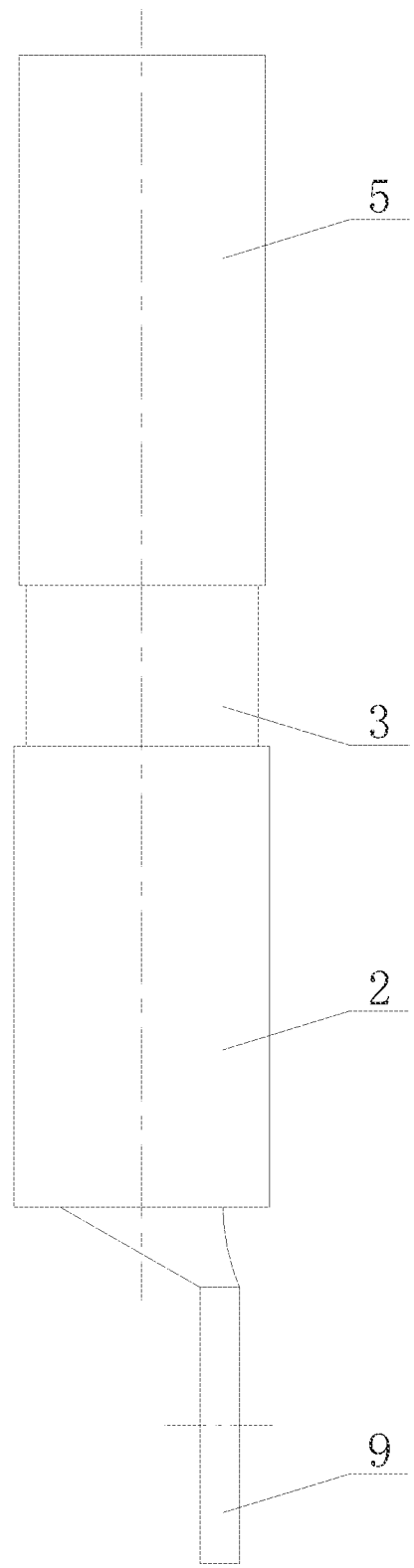
FIG. 1 is a front view of the joint structure of a high-voltage cable according to an embodiment of the present disclosure.

In the drawings: 1. inner-layer heat-shrinkable tube; 2. outer-layer heat-shrinkable tube; 3. outer-layer copper foil; 4. inner-layer copper foil; 5. outer insulating layer; 6. inner insulating layer; 7. cable core; 8. shielding layer; 9. external terminal; 9-1. connecting ring; and 9-2. sleeve.

DETAILED DESCRIPTION

The design concept of the present disclosure is:

In order to solve the defects in the prior art when cable connectors and high-voltage cables are connected, the present disclosure provides a joint structure of a high-voltage cable, wherein a heat-shrinkable tube isolates an annular terminal from a shielding layer, which enables the safe isolation between high voltage and low voltage; the shielding layer is outside the heat-shrinkable tube, which can avoid a too large diameter at the tail end of the high-voltage cable; and a copper foil wraps the shielding layer, which increases the strength of the shielding layer, and can prevent the shielding layer at the shielding-point contacting area from being, during the installation of the high-voltage harness, scraped to be damaged.

In order to make the objects, the technical solutions and the advantages of the present disclosure clearer, the embodiments of the present disclosure will be described below in further detail in conjunction with the drawings.

Figure 2:
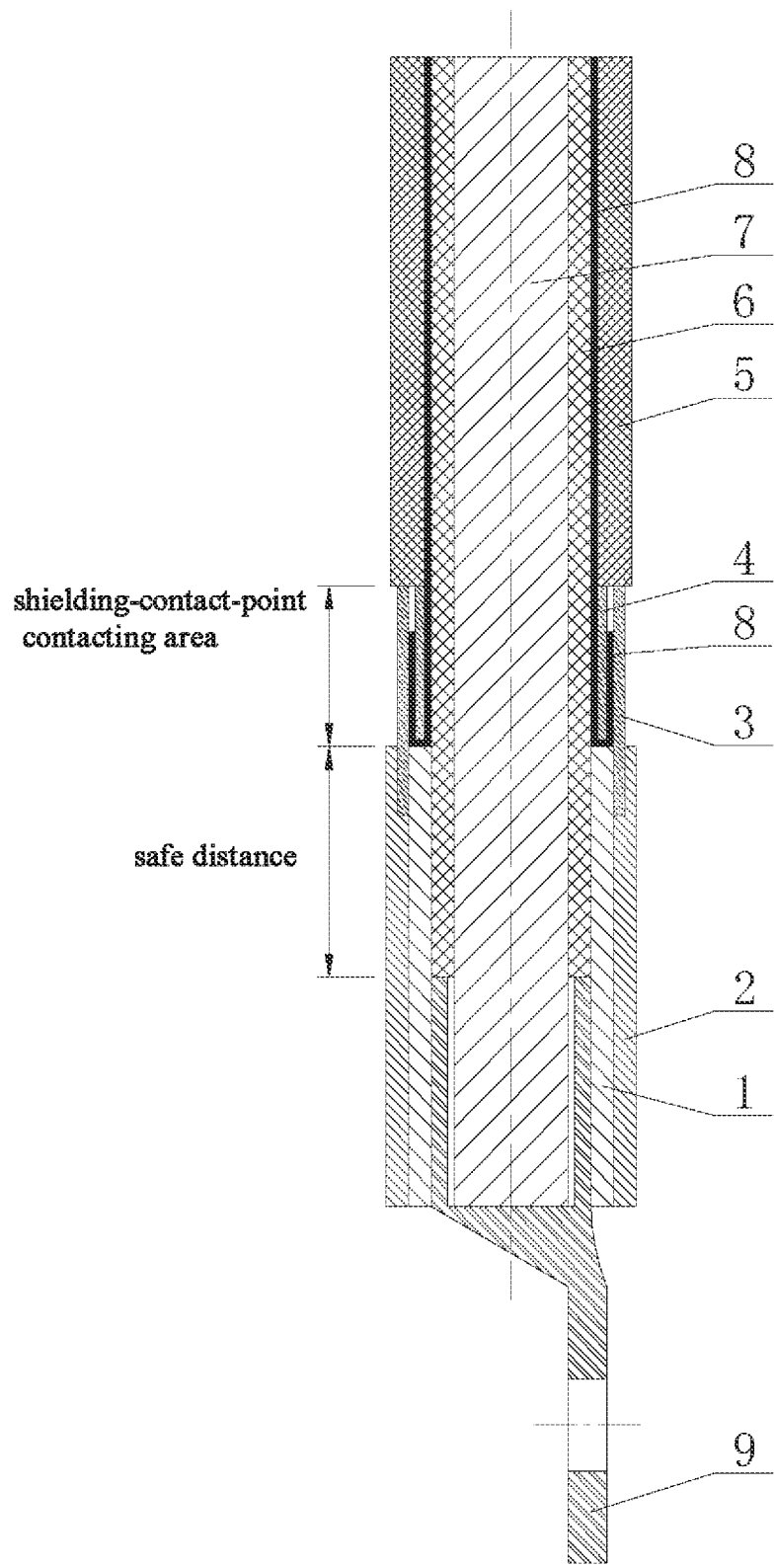
FIG. 2 is a sectional view of the joint structure of a high-voltage cable according to an embodiment of the present disclosure.
Figure 3:
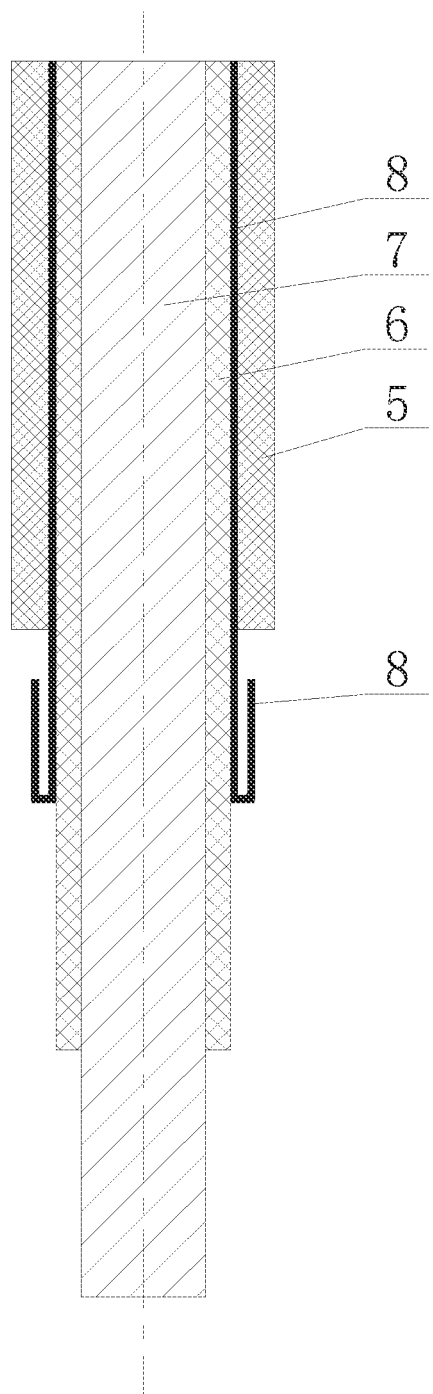
FIG. 3 is a sectional view of the high-voltage cable according to an embodiment of the present disclosure.

FIGS. 1 and 2 show a joint structure of a high-voltage cable. The joint structure comprises a cable core 7. The cable core 7 is wrapped from interior to exterior sequentially by an inner insulating layer 6, a shielding layer 8 and an outer insulating layer 5. A section of the inner insulating layer 6 and of the outer insulating layer 5 are stripped at an end of the cable core 7, and the length of the stripped section of the outer insulating layer 5 is greater than the length of the stripped section of the inner insulating layer 6, as shown in FIG. 3.

As shown in FIG. 2, the end of the cable core 7 is connected to an external terminal 9, the connection between the end of the cable core 7 and the external terminal 9 and an adjacent section of the inner insulating layer 6 are wrapped by a heat-shrinkable tube, a spacing is provided between an end of the heat-shrinkable tube and the outer insulating layer 5, the shielding layer 8 within the spacing is wrapped by a copper foil, and the shielding layer 8 is connected externally to a cable connector via the copper foil.

As shown in FIG. 2, the copper foil comprises an outer-layer copper foil 3 and an inner-layer copper foil 4, the length of the outer-layer copper foil 3 is greater than that of the inner-layer copper foil 4, the shielding layer 8 is folded within the spacing, and the folded section is located between the inner-layer copper foil 4 and the outer-layer copper foil 3.

Both of the inner-layer copper foil 4 and the outer-layer copper foil 3 may be wound by a plurality of layers, and by the winding, the shielding layer 8 can be firmly wrapped.

In the present embodiment, the shielding layer 8 is folded within the spacing, which improves the reliability of the insulation between the shielding layer 8 and the external terminal 9. The folded section of the shielding layer 8 is outside the heat-shrinkable tube, which effectively reduces the harness diameter of the heat-shrinkable tube, to solve the problem that the high-voltage cable cannot be inserted into the cable connector.

The copper foil increases the strength of the shielding layer 8, which can prevent the shielding layer at the shielding-point contacting area from being, during the installation of the high-voltage harness, scraped to be damaged.

Providing two layers of the copper foil improves the reliability of the shielding function of the shielding layer 8, mainly by improving the effectiveness of the external contact of the shielding layer 8.

As shown in FIG. 2, the heat-shrinkable tube comprises an inner-layer heat-shrinkable tube 1 and an outer-layer heat-shrinkable tube 2, and the outer-layer heat-shrinkable tube 2 wraps the inner-layer heat-shrinkable tube 1 and an adjacent section of the outer-layer copper foil 3, whereby the outer-layer copper foil 3 can be fixed. The inner-layer heat-shrinkable tube 1 isolates the external terminal 9 from the shielding layer 8, which enables the safe isolation between high voltage and low voltage.

The inner wall of the outer-layer heat-shrinkable tube 2 is thinned at a section where the outer-layer copper foil 3 is wrapped, whereby the diameter of the heat-shrinkable tube will not be too large.

FIG. 2 shows the externally contacting area of the shielding layer 8 and a safe distance between the shielding layer 8 and the external terminal 9. It can be directly observed in FIG. 1 that the outer-layer copper foil 3 is exposed to the exterior.

Figure 4:
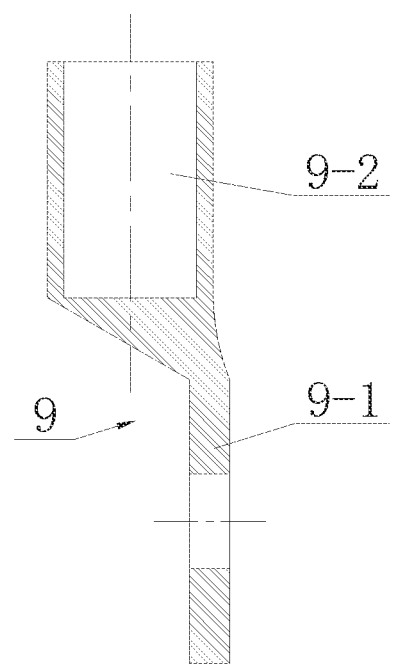
FIG. 4 is a sectional view of the external terminal according to an embodiment of the present disclosure.

As shown in FIG. 4, the external terminal 9 comprises a sleeve 9-2 and a connecting ring 9-1, the end of the cable core 7 is inserted into the sleeve 9-2, and the sleeve 9-2 is clamped to deform to realize fixed connection to the cable core 7.

The above are merely embodiments of the present disclosure, and are not limiting the protection scope of the present disclosure. Any modifications, equivalent substitutions, improvements and extensions that are made within the spirit and principle of the present disclosure should fall within the protection scope of the present disclosure.

What is claimed is:

1. A joint structure of a high-voltage cable, comprising a cable core, the cable core being wrapped from interior to exterior sequentially by an inner insulating layer, a shielding layer and an outer insulating layer, a section of the inner insulating layer and of the outer insulating layer being stripped at an end of the cable core, and a length of the stripped section of the outer insulating layer being greater than a length of the stripped section of the inner insulating layer, wherein the end of the cable core is connected to an external terminal, a connection between the end of the cable core and the external terminal and an adjacent section of the inner insulating layer are wrapped by a heat-shrinkable tube, a spacing is provided between an end of the heat-shrinkable tube and the outer insulating layer, the shielding layer within the spacing is wrapped by a copper foil, and the shielding layer is connected externally to a cable connector via the copper foil, wherein the copper foil comprises an outer-layer copper foil and an inner-layer copper foil, a length of the outer-layer copper foil is greater than a length of the inner-layer copper foil, the shielding layer is folded within the spacing, and a folded section is located between the inner-layer copper foil and the outer-layer copper foil.

2. The joint structure of a high-voltage cable according to claim 1, wherein the external terminal comprises a sleeve and a connecting ring, the end of the cable core is inserted into the sleeve, and the sleeve is clamped to deform to realize fixed connection to the cable core.

3. The joint structure of a high-voltage cable according to claim 1, wherein the heat-shrinkable tube comprises an inner-layer heat-shrinkable tube and an outer-layer heat-shrinkable tube, and the outer-layer heat-shrinkable tube wraps the inner-layer heat-shrinkable tube and an adjacent section of the outer-layer copper foil.

4. The joint structure of a high-voltage cable according to claim 3, wherein an inner wall of the outer-layer heat-shrinkable tube is thinned at a section where the outer-layer copper foil is wrapped.

* * * * *